UNITED STATES PATENT OFFICE.

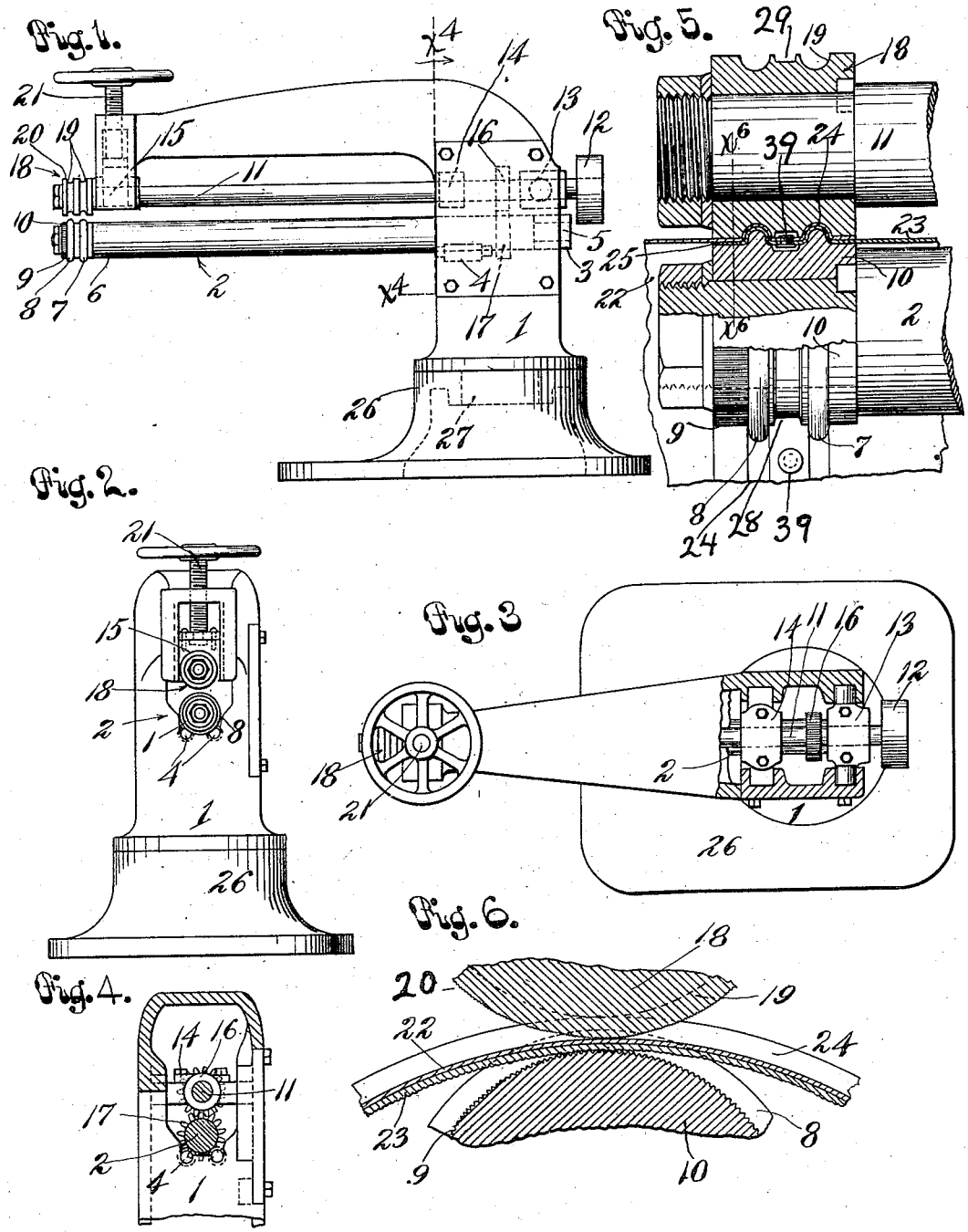

CHARLES HENRY BOGART, OF LOS ANGELES, CALIFORNIA.

ROUND-SEAM EXPANDER FOR MAKING SHEET-METAL WATER-PIPE.

No. 862,439.　　　　　Specification of Letters Patent.　　　　Patented Aug. 6, 1907.

Application filed March 14, 1906. Serial No. 305,963.

*To all whom it may concern:*

Be it known that I, CHARLES HENRY BOGART, a citizen of the United States, residing at Los Angeles, in the county of Los Angeles and State of California, have invented a new and useful Round-Seam Expander for Making Sheet-Metal Water-Pipe, of which the following is a specification.

An object of this invention is to provide means for doing away with a large portion of the riveting and punching that is now necessary in uniting the joints of sheet-metal water-pipe largely used on the Pacific coast.

Heretofore it has been the practice to rivet together a number of joints, usually seven or ten joints each thirty inches long, to form what is termed a pipe section, and the pipe is finally laid in a trench and fitted for use by telescoping and driving the ends of the sections together to make a continuous water-tight pipe.

By my invention I propose to unite the joints of pipe in a new way that is cheaper than the old, and that will produce pipe equally as good as, and cheaper than that produced by the old way. This I do by providing a machine that will interlock the ends of two joints of pipe so that they cannot be pulled apart, and I also provide for making the round seam joint practically water-tight by expanding the inserted joint outward. I also provide a channel to receive rivets for riveting the joints together at the round seam. I deem this invention pioneer with respect to each of these three features.

I regard this invention as pioneer in that I have constructed a novel machine for making sheet metal pipe by forming water tight round seams between the joints.

In carrying out the invention I have constructed a round seam expander for making a sheet metal water pipe comprising two shafts, each supported at one end and free at the other end, providing means for causing relative movement of the free ends of said shafts towards and from each other, providing the free ends of said shafts with beading means and swaging means, the beading means being between the swaging means and the supported ends of the shafts and providing means for rotating said beading and swaging means.

I am aware that machines, such as shown in the patent to Sargent, No. 142,945, have been provided for corrugating and beading sheet metal pipe, but my invention is an improvement over such machines in that my machine above mentioned is capable of producing a round seam uniting two pipe joints whereas the patented machine is only capable of forming the ends of the pipe joints, so that they may telescope together.

The accompanying drawings illustrate the invention:

Figure 1 is an elevation of a machine embodying this invention. Fig. 2 is an elevation of the same from the left of Fig. 1. Fig. 3 is a plan of the machine, broken to expose parts otherwise hidden. Fig. 4 is a section on line $x^4$—$x^4$, Fig. 1 looking right. Fig. 5 is an enlarged sectional detail of the tips of the seaming rollers in use forming a seam between two pipe joints, fragments of which are shown. Fig. 6 is an enlarged, fragmental cross-section of the same on line $x^6$, Fig. 5.

1 is the base of the machine which may be of cast iron or any other suitable material.

2 is the lower beading shaft mounted at one end in boxing 3 on said base 1 and supported by two rollers 4 between the journaled end 5 of the shaft 2 and the free end 6 thereof; such free end constituting a beading and swaging roller with beads 7 and 8 and with a milled portion 9 at the extreme end. Said beads 7 and 8 and the milled portion 9 may be constructed on a sleeve 10 on the end of the lower beading shaft 2.

11 designates the upper beading shaft driven by a driving pulley 12 and supported by a pivoted boxing 13, loose boxing 14 and 15, and connected by gearing 16, 17, with the lower beading shaft 2. Shaft 11 is provided with a beading roller 18 having grooves 19 to correspond with the beads 7 and 8 of the lower beading and swaging roller, and also provided with a milled portion 20 corresponding to the milled portion 9 of the lower beading and swaging roller, excepting that the indentations are slight, the same being intended only to assist in turning the pipe-joints as the work proceeds.

The milled portions 9 and 20 of the two rollers constitute swaging means; the portion 20 serving to support the pipe against the thrust of the more deeply-milled portion 9. The portions 7, 8, and 19 of the beading rollers constitute interlocking beading means for beading the ends of the pipe-joints together, with two beads having a channel between them to receive the ends of rivets which may be employed to hold the joints together before the beads are formed. The undershaft 2 is approximately of the same diameter as the channeled portion of the swaging and beading means, so that when a section of pipe is inserted between said shafts in the space between the beading and swaging means and the support of said shaft, the main body of said section will rest upon and be supported by said undershaft.

21 is a tension screw adapted to apply pressure to the free end of shaft 11 to force the top beading roller toward the lower beading roller.

In practical use, the operator will drive together the telescoped ends of two joints 22, 23, of sheet-metal pipe, and will then pass one of such joints over the free end of the lower beading shaft and bring the united portions of said joints between the beading rollers. Then the screw 21 will be turned to force the upper beading roller 18 toward the lower beading roller. Meanwhile, the upper beading roller may be driven by power applied to pulley 12 so that the two pipe joints will be rotated, beads 24 will be formed in a round seam, and the inside lap 25 will be expanded toward the outer joint 22 by means of the milled portion 9.

The gearing 16, 17, causes the two rollers to rotate together to turn the joints and produce the beading and expanding. The teeth of the gears have sufficient play to allow the necessary movement of the rollers toward and from each other to take in and release the pipe. When the seam has been formed the screw 21 will be turned to withdraw the upper roller to release the pipe which will thereupon be withdrawn and the above-described operation will then be repeated.

The base 1 is preferably pivoted on a sub-base 26 by a pivot 27, so that the mandrel 2 can be swung around left and right from one position to another to receive work alternately from two operators each of whom may have a stake of the usual kind, not shown, on which he will assemble two joints while the other operator will be expanding and beading together another two joints, and so on.

The sheet metal used for making pipe on this machine may be of any character in common use for making sheet metal water-pipe. The same may be from No. 16 to as heavy as 3/16 of an inch thick sheet steel or other suitable sheet metal.

I have found it advisable in the process of manufacturing pipe with this machine to fasten the joints as 22 and 23 by a few rivets, as 39, before the joints are placed on the beading shaft 2. The beading shafts 2 and 11 are provided with annular ways or grooves 28, 29 to receive the ends of rivets between the portions of said shafts which form the beads 24 of the round seam, the purpose of said rivets being to insure against any displacement of the joints during the process of expanding.

The milled portion 9 of the beading shaft 2 is of sufficient depth to swage and expand the end of the inner lap of the round seam, so that a close connection will be formed between the inner and outer joints, thus insuring great strength of the seams in the pipe sections. Owing to the beading means of shaft 2 being located between the supported end and the milled portion at the outer end of said shaft, the milled outer end of said shaft is made to engage the extreme end portion of one section of the pipe inside the joint, thus expanding the same against the end portion of the other section to form a tight joint. This construction makes it possible to swage the sheet metal outwardly inside the joint to make a tight seam comparatively smooth on the inside. Owing to the lower shaft having a periphery which is unobstructed from the beading and swaging means at the outer end thereof, all the way inwardly to the support thereof located solely at its inner end, the whole length of an ordinary joint of pipe may be placed on the lower shaft in contact with its moving periphery to be properly rotated during the operation of uniting two joints. The milled portion 20 of the outer shaft 11 is not sufficiently deep to swage the outside lap of said joint.

When the requisite number of joints have been expanded together to form a section the same will be dipped in asphaltum in the usual way of manufacturing pipes.

In order to produce a water tight round seam at the joint great rigidity against the down thrust from the screw 21 is necessary upon the part of the beading shaft 2 and in order to effectuate the desired result the antifriction rollers 4 are mounted under said beading shaft 2 as near the beads as possible.

What I claim is:—

1. A round seam machine adapted to interlock sections of pipe to form a sheet metal pipe, comprising a base, supporting rollers mounted in said base, boxing on said base, a beading shaft mounted at one end in the boxing and antifrictionally supported between the journaled end of the shaft and the free end thereof, such free end being provided with two juxtaposed beads and a milled portion, another beading shaft interlocking with said beads, a space being provided between said shafts to receive the main body of a section of pipe whereby two sections of pipe may be united with a round seam interlocking two pipe sections together, a pulley for driving one of said beading shafts, pivoted and loose boxing for supporting said shaft, and gearing connecting the two shafts.

2. A machine for making round seams of sheet metal water pipe comprising two beading shafts each of which is provided with a milled portion and one of which is movable toward and from the other, said shafts being provided with interlocking beading means, the milled portion of the shaft that is movable toward and from the other being of less depth than the milled portion of the other shaft; and the milled portion of said other shaft being adapted to swage the inside lap of a round seam between two joints of pipe.

In testimony whereof, I have hereunto set my hand at Los Angeles, California this 7th day of March 1906.

CHARLES HENRY BOGART.

In presence of—
JAMES R. TOWNSEND,
JULIA TOWNSEND.